(12) United States Patent
Liu et al.

(10) Patent No.: US 8,370,626 B2
(45) Date of Patent: Feb. 5, 2013

(54) METHOD AND APPARATUS FOR A CONFIGURABLE ONLINE PUBLIC KEY INFRASTRUCTURE (PKI) MANAGEMENT SYSTEM

(75) Inventors: Jiajing Liu, San Diego, CA (US); Thomas J. Barbour, San Diego, CA (US); Liqiang Chen, San Diego, CA (US); Ying Chen, San Diego, CA (US); Wei Lin Chou, San Diego, CA (US); Christopher P. Gardner, La Jolla, CA (US); Stuart P. Moskovics, San Diego, CA (US); Xin Qiu, San Diego, CA (US); Chia Ling Tsai, San Diego, CA (US); Ting Yao, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 237 days.

(21) Appl. No.: 12/854,922

(22) Filed: Aug. 12, 2010

(65) Prior Publication Data
US 2011/0047374 A1 Feb. 24, 2011

Related U.S. Application Data

(60) Provisional application No. 61/233,356, filed on Aug. 12, 2009.

(51) Int. Cl.
*H04L 9/00* (2006.01)

(52) U.S. Cl. .................. 713/156; 713/157; 713/175

(58) Field of Classification Search .................. 713/150, 713/166, 173, 175, 155–158; 726/1–6, 10; 380/277, 282, 285
See application file for complete search history.

(56) References Cited

U.S. PATENT DOCUMENTS

| | | | |
|---|---|---|---|
| 6,324,645 B1 | 11/2001 | Andrews et al. | |
| 6,367,013 B1 * | 4/2002 | Bisbee et al. | 713/178 |
| 6,564,320 B1 | 5/2003 | de Silva et al. | |
| 6,615,347 B1 | 9/2003 | de Silva et al. | |
| 6,651,166 B1 | 11/2003 | Smith et al. | |
| 7,308,574 B2 * | 12/2007 | Dare et al. | 713/157 |
| 2009/0037729 A1 | 2/2009 | Smith et al. | |
| 2010/0070755 A1 | 3/2010 | Himawan et al. | |
| 2010/0082975 A1 | 4/2010 | Metke et al. | |
| 2010/0115267 A1 | 5/2010 | Guo et al. | |

\* cited by examiner

*Primary Examiner* — Hosuk Song
(74) *Attorney, Agent, or Firm* — Thomas A. Ward

(57) ABSTRACT

A method and apparatus are provided for generating identity data to be provisioned in product devices that are a part of a project. The method includes establishing a template associated with each CA in a hierarchical chain of CAs having a root CA at a highest level in the chain and a signing CA at a lowest level in the chain. The template associated with the signing CA inherits mandatory attribute fields specified in the root CA and any intermediate CA in the hierarchical chain. The mandatory attribute fields are user-specifiable fields to be populated with PKI data. A configuration file is generated upon receipt of an order for digital certificates using PKI data provided by a user to populate the mandatory attribute fields of the template associated with the signing CA. The digital certificates requested in the order are generated using the PKI data in the configuration file.

20 Claims, 10 Drawing Sheets

CN=$(MAC) Test Model,O="Motorola, Inc.",OU=WiMAX Forum(R) Devices,OU=chipsetID: $(CHIPSET_ID),OU=prodManufacturer:$(PROD_MANUFACTURER)

*FIG. 6*

CN=$(MAC) Test Model,O="Motorola, Inc.",OU=WiMAX Forum(R) Devices,OU=chipsetID:12345,OU=prodManufacturer:$(PROD_MANUFACTURER),C=US

*FIG. 8*

KEY AND CERTIFICATE GENERATION REQUEST

CURRENT PROFILE: MOTOROLA CHINA WiMAX PRODUCT MAC +1

DESCRIPTION:

CA CERT: TEST MOTOROLA WiMAX SUB CA

ACCEPTED MAC: CLICK FOR DETAILS
FF0100000000 - FF0100FFFFFF

MAC(s) Per Cert: 2

AVAILABLE CERTIFICATES: 10000

CERTIFICATE QUANTITY: 5000

START MAC: FF010001B066

[GET NEXT AVAILABLE]

End MAC: FF010001D775

Model Name: MD1000
Manufacturer: MOTOROLA, INC.
OU: WiMAX Forum(R) Devices

[SELECT PROFILE] [CANCEL REQUEST] [REVIEW REQUEST]

*FIG. 9*

METHOD AND APPARATUS FOR A CONFIGURABLE ONLINE PUBLIC KEY INFRASTRUCTURE (PKI) MANAGEMENT SYSTEM

STATEMENT OF RELATED APPLICATIONS

This application claims the benefit of U.S. Provisional Patent Application Ser. No. 61/233,356, filed Aug. 12, 2009, which is incorporated herein by reference in its entirety.

BACKGROUND

Public key cryptography is an approach to enabling secure communications using key pairs. Each key pair includes a public key and a private key. The public key and private key are related so that, for example, a message encrypted by one key may be decrypted only by the other, but it is computationally infeasible to deduce the private key given the public key. In addition to message encryption, the key pair may be used to perform other functions as well. The private key is typically created and securely held by an entity; while the corresponding public key is typically made widely available. Secure communications between parties may then be enabled by using the parties' public and private keys.

The use of public key cryptography addresses many of the inherent security problems in an open network such as the Internet. However, two significant problems remain. First, parties must be able to access the public keys of other entities in an efficient manner. Second, since in many protocols entities are associated with and in some sense identified by their public keys, there must be a secure method for parties to verify that a certain public key is bound to a certain entity.

A public key infrastructure (PKI) system addresses these two problems. In one common approach, the public key infrastructure is based on digital certificates, which are used to associate a certain public key pair to a certain entity with some degree of integrity. The public key management infrastructure typically would include a database of digital certificates, certification authorities who issue the certificates, and other infrastructure for authenticating parties. A number of digital certificate services are typically provided in order to establish, disseminate, maintain, and service the public keys and associated digital certificates used in a PKI. These services are typically provided to end users by CAs or third party operators. The digital certificate services provided typically include the following: enrollment, status report, retrieval and search services as well as validation, revocation, renewal and replacement services.

FIG. 1 shows one example of a format for identity data such as a digital certificate 100. In some implementations, the digital certificate 100 may comply with the ITU-T Recommendation X.509 (1997 E), as developed by the ISO/IEC/ITU groups. Of course, other certificate formats and other types of identity data may be employed as well. The digital certificate 100 includes attributes providing technical information such as a certificate serial number 101. Another attribute, attribute 102 specifies the digest algorithm used in generating the certificate signature. The attribute 103 specifies the signing algorithm (such as RSA or ECC) used in conjunction with the digest algorithm 102 when generating the certificate.

The digital certificate 100 also includes the Subject Name attribute 104, which describes the entity whose public key is being certified, who is sometimes referred to as the Subject. X.509 certificates use distinguished names (DNs) as the standard form of naming. A DN is typically made up of the following components: CN=common name, OU=organizational unit, O=organization, L=locality, ST=state or province, C=country name. The Common Name (CN) of the Subject attribute is normally a required data field. Some possible values for the CN are a hardware-based identifier such as a MAC Address or IMEI, a DNS hostname, or a person's name.

The digital certificate 100 also includes attribute 105, sometimes referred to as the certificate issuer name, which refers to the Certificate Authority (CA) issuing the digital certificate 100 to a Subject. A CA is an entity who issues other digital certificates. The CA has its own digital certificate associated with the key used for signing other entity's certificates. A copy of a CA's digital certificate would be necessary to validate the digital certificate 100 issued by the CA.

The digital certificate 100 also includes the entity's Subject Public Key 106 which is a value generated using an asymmetric cryptographic algorithm (such as RSA or ECC). Included as well is the validity period attribute 107 which is the start and end date during which the certificate is considered valid. The start date in the validity period 107 is generally the date and time that the issuing CA signed the certificate.

Each of the attributes described above, except for the Issuer Name, are to be populated with entity-specific data. The Issuer Name information 105 would be common to all certificates issued by the same Issuer 105.

After a digital certificate 100 is confirmed to be issued by the Issuer 105, a chain of trust must be validated as shown in FIG. 1. This is performed by verifying that the certificate associated with the Issuer 105 is valid as well. Performing this verification step requires a copy of the digital certificate 100 associated with Issuer 105 for every certificate being validated. The cryptographic signature verification is performed on every digital certificate using the Issuer's certificate. This step is repeated until the Issuer Name 105 in the digital certificate 100 is the same as the Subject Name 104 in the same certificate. A certificate with an Issuer Name attribute equal to the Subject Name attribute is called a Root Certificate and must be trusted. A Root Certificate is associated with a specially trusted entity and is an integral part of every PKI.

In the era of information technology, PKI technology is being widely adopted by organizations to implement security features in the products and services they provide. A well implemented PKI system and its associated practices and procedures are often deeply involved in the organization's product development process, from the design phase all the way to the manufacturing phase. However, each organization typically has its own security policy, different manufacturing processes, and a unique style of engineering collaboration. All these differences have led to the development of complex and customized PKI systems that need to be maintained by each organization.

The scenario becomes even more complex when the security policy is defined and enforced by an external party, such as a consortium. As more and more standards or technologies are developed by multiple companies in collaboration with one another, consortiums are becoming a popular entity used to protect the best interests of all parties involved. Consequently, the integration between the consortium's PKI system and a participant organization's home-grown PKI system becomes an important but challenging task that every participant organization has to deal with. In some cases an organization is involved in multiple consortiums due to the diversified nature of many product development projects. For the consortiums, maintaining a sophisticated PKI system that supports the various security requirements imposed by the participating companies can be overwhelmingly difficult.

SUMMARY

In accordance with one aspect of the invention, a method is provided for generating identity data to be provisioned in product devices that are a part of a project. The method includes establishing a template associated with each CA in a hierarchical chain of CAs having a root CA at a highest level in the chain and a signing CA at a lowest level in the chain. The template associated with the signing CA inherits mandatory attribute fields specified in the root CA and any intermediate CA in the hierarchical chain. The mandatory attribute fields are user-specifiable fields to be populated with PKI data. A configuration file is generated upon receipt of an order for digital certificates using PKI data provided by a user to populate the mandatory attribute fields of the template associated with the signing CA. The digital certificates requested in the order are generated using the PKI data in the configuration file.

In accordance with another aspect of the invention, a method is provided for managing PKI data used in a PKI project that is logically divided into a plurality of hierarchical levels each of which is associated with at least one participating organization and/or a product that is part of the project. The method includes establishing a PKI data management policy for each hierarchical level such that the PKI data management policy at an uppermost of the levels is least restrictive and the PKI data management policy at a lowermost of the levels is most restrictive. The PKI data management policies are implemented so that PKI data associated with each hierarchical level conforms to the PKI data management policy established for that level.

In accordance with another aspect of the invention, a PKI management system is provided. The system includes a front-end interface that is accessible to users over a communications network and at least one order fulfillment processor. The order fulfillment processor is configured to generate identity data to be provisioned in product devices in accordance with customer requests associated with a project and received by the front-end interface. The front-end interface is configured to establish a template associated with each CA in a hierarchical chain of CAs associated with the project. The hierarchical chain of CAs has a root CA at a highest level in the chain and a signing CA at a lowest level in the chain. The template associated with the signing CA inherits mandatory attribute fields specified in the root CA and any intermediate CA in the hierarchical chain. The mandatory attribute fields are user-specifiable fields to be populated with PKI data. The front-end interface is also configured to generate a configuration file upon receipt of an order from a user for digital certificates using PKI data provided by the user to populate the mandatory attribute fields of the template associated with the signing CA. The front-end interface is further configured to generate the digital certificates requested in the order using the PKI data in the configuration file.

BRIEF DESCRIPTION OF THE DRAWINGS

FIG. 6 shows an example of the subject attribute for the digital certificate that is to be generated from the PCP defined in FIG. 5.

FIG. 8 shows an example of the subject attribute for the digital certificate that is to be generated from the PCP defined in FIG. 7.

FIG. 9 shows an example of GUI that may be employed by a user to generate a batch of digital certificates.

DETAILED DESCRIPTION

A concrete example will be presented herein to facilitate an understanding of the PKI system described herein. It should be emphasized that this illustrative example is presented by way of illustration only and not as a limitation on the methods, techniques and systems described herein. In this example a consortium is formed with the goal of overseeing a WiMAX™ 4G network project. In this project various WiMAX devices need to be provisioned or loaded with PKI data such as keys and certificates so that they can securely communicate over a network. Various organizations who manufacture WiMAX devices may wish to load WiMAX PKI data into their devices. The WiMAX Consortium defines security policies and the format of the device certificate PKI data. Accordingly, each device manufacturing organization needs to adhere to all WiMAX policies and PKI data formats. Additionally, each device manufacturer may have internal requirements above and beyond those imposed by the consortium, which require the use of even more specific PKI data formats across their different WiMAX products. The methods, techniques and systems provided herein can satisfy the need to enforce policies throughout the PKI system while also providing the flexibility to accommodate multiple parties who use the system, each with their own business, product and security requirements concerning PKI data.

Figure 1:
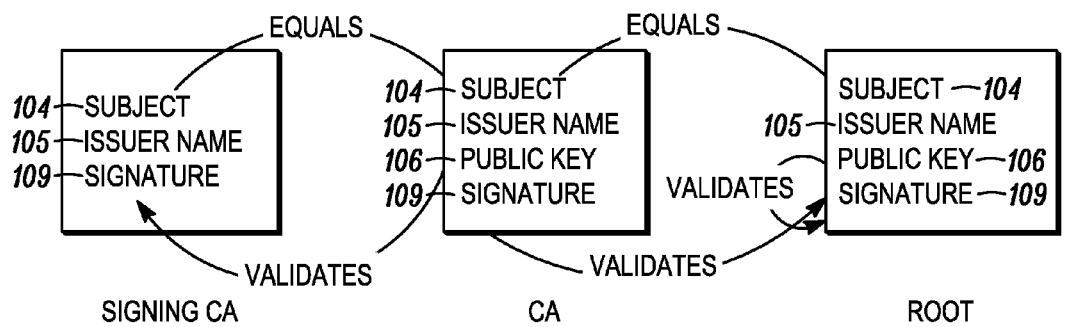
FIG. 1 shows one example of a format for identity data such as a digital certificate.
Figure 2:
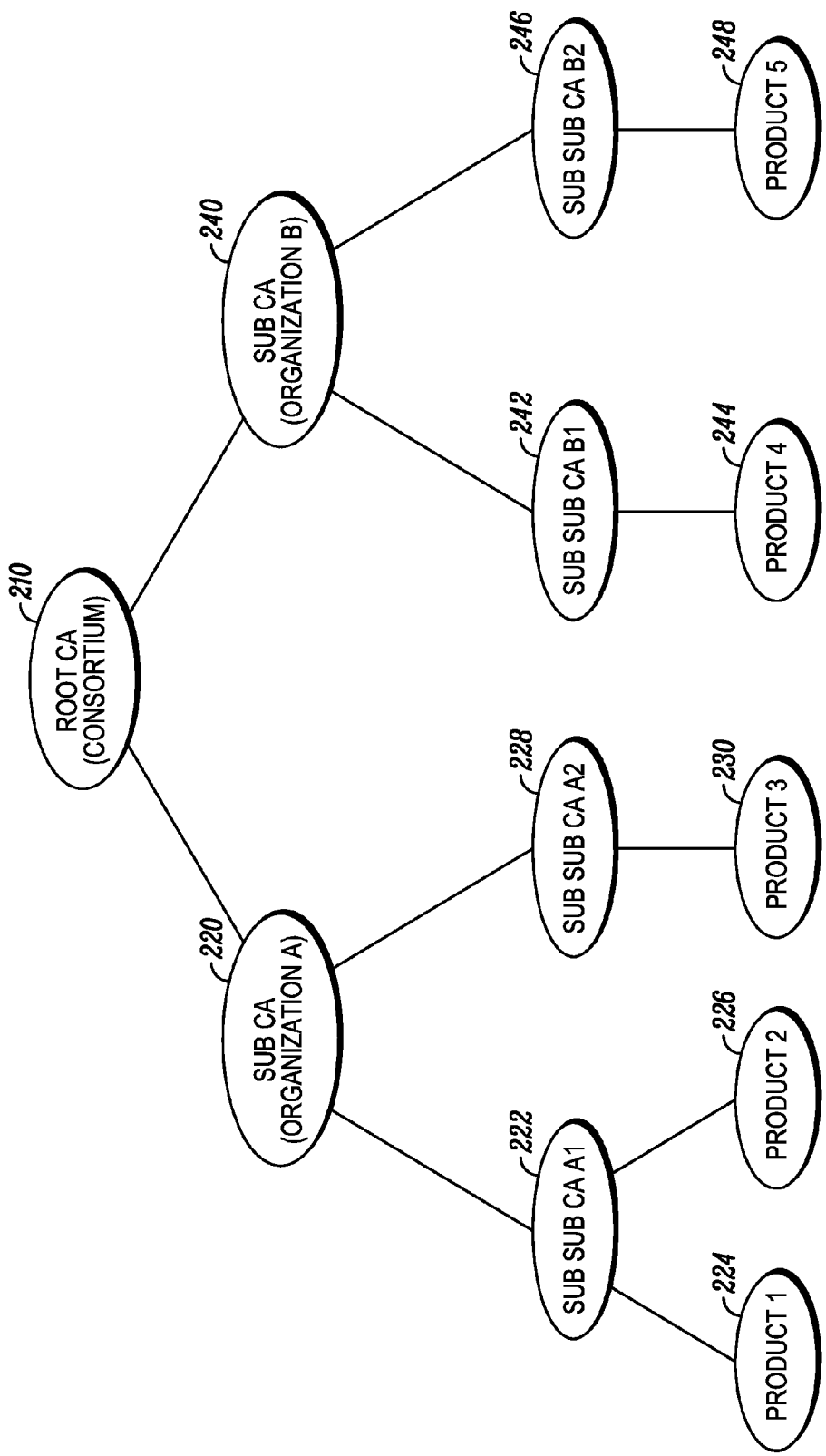
FIG. 2 illustrates an example of a certificate authority (CA) hierarchy along with several other related entities.

FIG. 2 illustrates an example of a CA hierarchy along with several other related entities. The party who owns and is responsible for each CA in the figure is shown in parentheses within the CA. The Root CA 210 belongs to a Consortium. The term Consortium is used to refer to the organization in charge of the PKI System; it may be a single entity or organization or an actual consortium composed of several organizations. Similarly, organizations A and B are WiMAX participant organizations who wish to obtain WiMAX PKI data provided by the system. Sub Sub CA A1 (222) and A2 (228) belong to Organization A. Similarly Sub Sub CA B1 (242) and Sub Sub CA B2 (246) belong to Organization B.

Each organization may define several products. A product represents a category of PKI data that is signed by a specific signing CA. Each product may represent a product line or some group of devices whose PKI data share a signing CA. A device is a single instance of a product. Product 1 and product 2 are associated with Sub Sub CA A1, which serves as their signing CA. Note that the number of CA levels and the particular level with which a product is associated with a sub CA are not fixed). Rather, both the number of levels and the level at which a sub CA is associated with the product may be established by the consortium and the organizations' needs and the PKI system requirements. The CA chains, products and organizations associated with each product represent the various elements of a PKI system and they can be configured using the mechanisms described below.

As the scenario presented above illustrates, multiple parties may be involved in the provision of digital certificates or other identity data for one or more product lines. Since each party may have its own CA(s) that chain to a shared root, it would be helpful if each party were provided with a digital certificate template that could be used to specify the attributes required by its respective CA or CAs in the hierarchy. The digital certificate template, referred to herein as a certificate profile template (CPT), would ideally provide sufficient flexibility so that it could be tailored to the needs of each CA in the hierarchy and used in a wide range of different projects.

A CPT provides a hierarchical method for defining the attribute values to be generated in a device certificate, such as a X.509 digital certificate. The CPT's attributes may be required in the generated certificate or may be optional; and their definitions may include constant values and/or variable values to be defined before the certificate is generated. An example of a CPT's attribute definitions is shown in Table 1.

TABLE 1

Sample Distinguish Name Defined in a CPT

| Attribute Name | Value | Is Optional in PCP |
| --- | --- | --- |
| Common Name | $(MAC) $(MODEL_NAME) | False |
| Org | $(ORG) | False |
| OrgUnit | ABC Consortium Devices | False |
| OrgUnit | chipsetID:$(CHIPSET_ID) | True |
| OrgUnit | productID:$(PRODUCT_ID) | True |
| Country | $(COUNTRY) | True |

The first column of Table 1 lists six examples of attributes, which include a Common Name attribute, an Org attribute, three OrgUnit attributes and a Country attribute. The second column of Table 1 lists the corresponding values for each of these attributes. All the attribute values include variables (denoted using the format $( ... )), except for the first OrgUnit attribute, which is populated with its fixed, final value, "ABC Consortium Devices." On the other hand, the Common Name attribute includes the two variables "MAC" and "Model_Name." The third column of Table 1 specifies if the attribute is optional in the Product Certificate Profile (denoted as PCP), which is defined further below.

A variable represents a fixed value that is not yet defined. Any attribute included in a certificate generated by the PKI system will have all of its variables specified before the generation occurs. As described later, the values of variables can be defined at various stages in the certificate generation process.

Variables may also contain a set of rules such as data type and validations. These rules ensure that the values defined to replace the variables are valid and have the proper format. Table 2 presents illustrative parameters that may be used to define a variable.

TABLE 2

Variable Fields

| Variable Field | Description |
| --- | --- |
| ID | Variable name as its unique identifier |
| DisplayName | A more meaningful name for users, e.g. PCP creators |
| Description | Description of the variable |
| Type | Data type of the variable |
| IsUnique | Determines whether the variable has a unique value during PKI data generation. If true, the variable cannot be assigned with a value upon creation of PCP. Instead, value would be populated in the PKI generation phase. |
| Default Value | Default value of the variable |
| Value | Actual value assigned to the variable |
| Validations | A set of validation rules restrict value to be in a proper format |

Table 2 shows the fields that are used to define a variable in the CPT along with their corresponding descriptions. The fields include a variable ID, which is the name of the variable (such as those shown in Table 1). Another field is a Type field, which specifies the type of data that is to populate the variable. For instance, in the case where the variable is a product ID, the Type field may specify the use of a MAC address. Other illustrative fields are as shown in the Table.

A Certificate Profile Template is normally associated with a CA. A CPT associated with a CA represents the attribute requirements specified by the organization that owns the CPT. Thus, the definitions of the attributes used in the CPT are configured by this organization. A CA may have multiple CPTs associated for different purposes. For instance, different product lines may chain to the same CA. The organization manufacturing these products may want a different set of attribute values defined for each product line. Therefore each product line may use its own CPT. CPTs are designed to reflect the hierarchical structure formed by the CAs chains with which they are associated.

A CPT associated with a root CA forms the base definition that all product certificates generated from that root's chain must respect. At this level, the CPT is at its most generic state and places a minimum number of restrictions on the format of the digital certificate. Any CPT associated with a CA below the root must inherit the attributes from the CPTs defined above it in the chain. Therefore, each sub CA below the root CA may place additional restrictions and requirements on the certificate format. For example, if the CPT shown in Table 1 is associated with a root CA and an organization sub CA signed by the root CA can create their own CPT to refine the attributes for the generated device certificates. This refinement can be seen in Table 3.

TABLE 3

Sample Derived CPT

| Attribute Name | Value | Is Optional in PCP |
| --- | --- | --- |
| Common Name | $(MAC) $(MODEL_NAME) | False |
| Org | Organization A | False |
| OrgUnit | ABC Consortium Devices | False |
| OrgUnit | productID:$(PRODUCT_ID) | True |
| Country | US | False |

The organization, in this example Organization A, modified the base values inherited from the root CA's CPT from Table 1. The organization defines the values of the "ORG" and "COUNTRY" variables as "Organization A" and "US" respectively. The organization also makes the Country attribute required and removed the "chipsetID" of the OrgUnit attribute. This example outlines the changes a derived CPT is able to make. A CPT that is derived from another CPT inherits all its current attributes. The derived CPT may define values for any non-unique variables. It should be noted that unique variables can only be filled at the time of generation, as shown in Table 2. The CPT derived from another CPT may also make any optional requirement required or it may remove any optional attribute. The derived CPT cannot add new attributes, remove required attributes, or make a required attribute optional that is inconsistent with the restrictions from its parent CPT.

Figure 3:
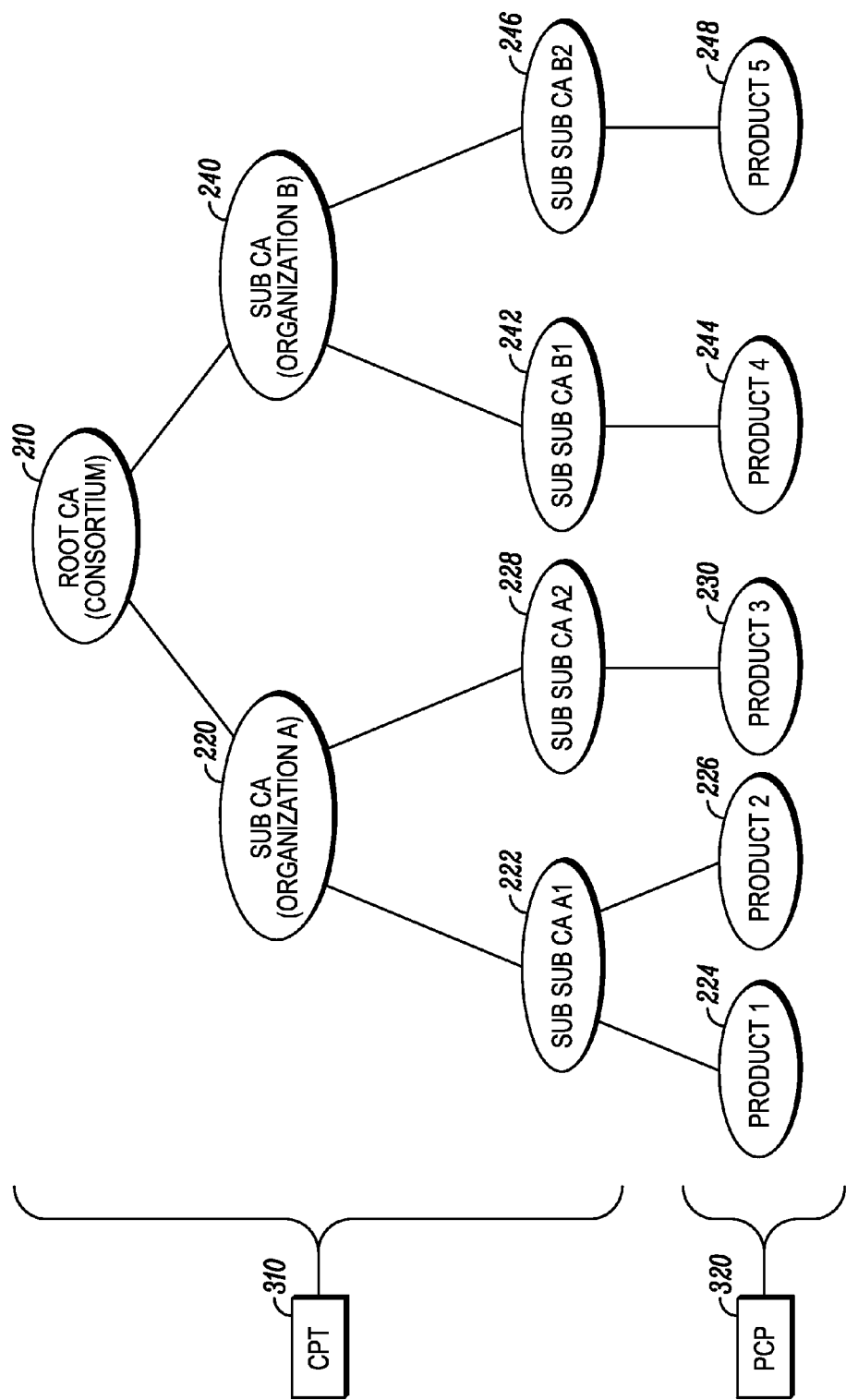
FIG. 3 illustrates another example of a certificate authority (CA) hierarchy along with several other related entities.

This inheritance based hierarchical structure allows infrastructure governing organizations, such as consortiums, to configure a generic format in a CPT with which all device certificates participating in the infrastructure must comply. Participating organizations can refine this generic format in a derived CPT that reflects their own requirements and information while ensuring compliance with the originally defined format. This refinement further restricts the possible values that the certificates may have, while remaining consistent with the format described by its inherited CPTs. Therefore, each derived CPT is more refined and restrictive than the CPTs in the chain above it. The number of derived refinements that can exist for a CPT chain is only limited by the number of levels in the CA chain. For example, in FIG. 3, a CPT can be defined for the root CA and each sub-CA and sub-sub-CA, creating a CPT chain three templates long.

Not every CA in a chain must have a CPT associated with it. When a user creates a new CPT, the system begins a bottom-up search starting at the issuer of the CA the CPT is associated with. This search moves up along the CA chain to the root until it finds the first CA with a CPT associated with it. This upper layer CPT is inherited by the new CPT. If multiple CPTs are associated with that CA, the user can choose which CPT to inherit from. If the search reaches the root CA and no CPTs have been found, the new CPT is not derived from an existing CPT and may define any attributes, variables, and requirements without any restriction. In common practice, the root CA will generally have at least one CPT associated with it.

Figure 4:
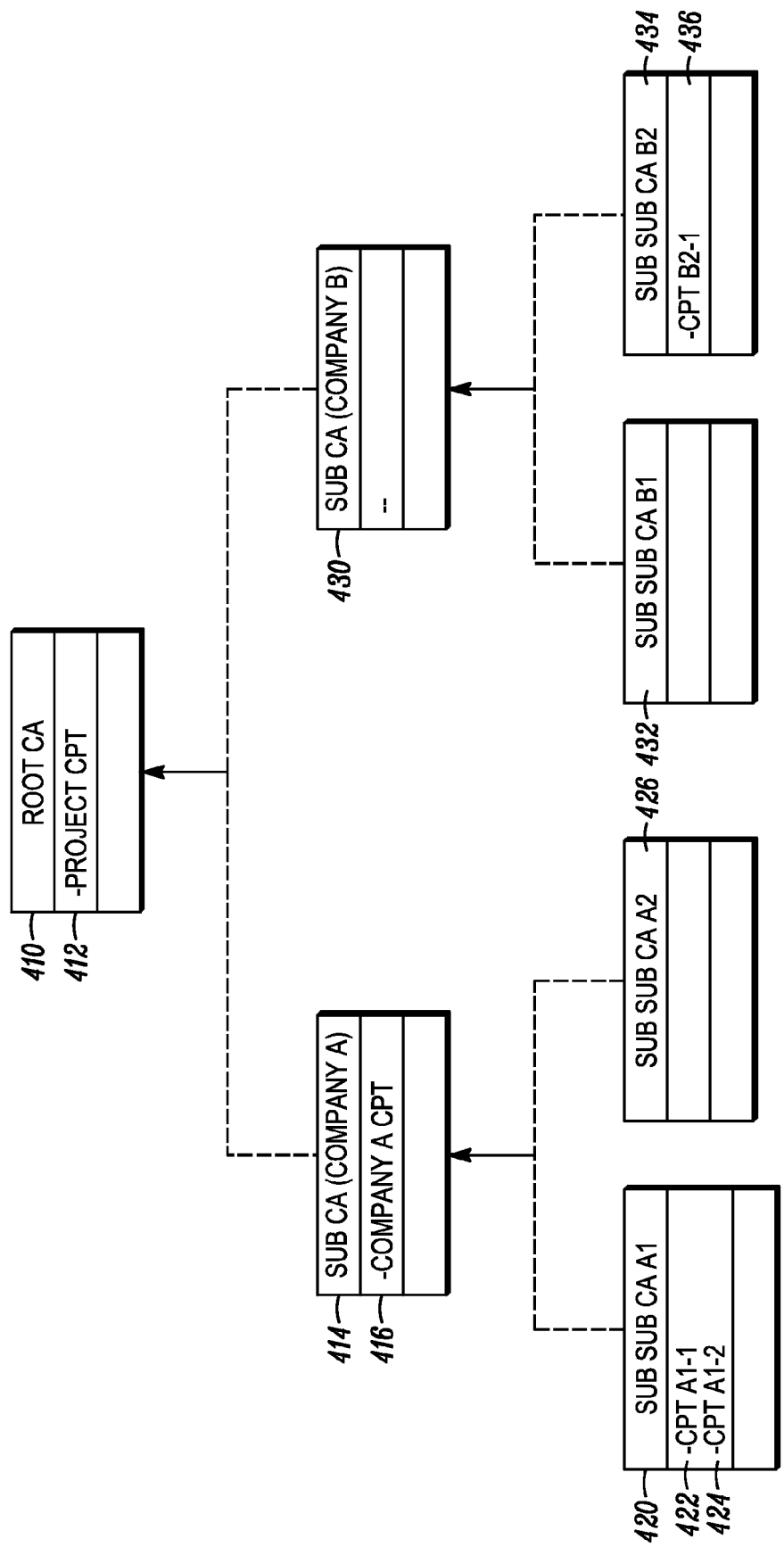
FIG. 4 shows an example of a search process used to locate Certificate Profile Templates (CPTs) in a chain of CPTs.

An example of this search process is shown in FIG. 4. If company A decides to add a CPT to sub-sub CA A2 (426), the system will begin its search for a base CPT at sub-sub CA A2's issuer, Sub CA (Company A, 414). Since Sub CA A (414) is associated with Company A's CPT (416), the search completes and the new CPT for sub-sub CA A2 inherits from Company A CPT (416).

In another example, when company B adds a CPT to sub-sub CA B1 (432), the system begins its search for a base CPT at sub-sub CA B1's issuer (430). Since Sub CA (Company B, 430) does not have a CPT associated with it, the search continues to Sub CA B's issuer, the root CA (410). The root CA is associated with the Project CPT (412) which is used to derive sub-sub CA B1's new CPT. Lastly, if the Consortium organization creates a new CPT the search algorithm at the root CA (410), the search recognizes that the root CA is self-signed, and then allows the new CPT to be defined without any inherited requirements.

In summary, the governing organization of each CA in the chain may impose its requirements on the format and information that is to be included in the digital certificate. These requirements are reflected in the CPT. That is, each CA in the chain may restrict its respective CPT in some ways, such as by mandatorily including attributes that are optional in its upper level CPT. The variable can have the value that is either a user-supplied value that is provided at the time of certificate generation or a predefined value is specified during the configuration time. In this way different organizations can work together within a PKI infrastructure in a way that allows each device certificate generated to comply with a standard format required by the consortium while also meeting the requirements and formatting decisions of the participating organizations.

The final revision of the certificate profile template (the "governing CPT") before certificate generation is referred to as the Product Certificate Profile (PCP), and it is inherited from a CPT. There are two substantial differences that distinguish a PCP from a CPT. First, PCPs are associated with products directly whereas CPTs are linked to CAs in the CA hierarchy. As shown earlier in FIG. 3, products are one level below the lowest level sub CAs, which eventually act as the signing CAs for the product's device certificates. When creating a PCP, a source CPT is selected by the user from among the CPTs available to the user. This selection is made via a bottom-up search algorithm performed on the user's associated CA hierarchy. This bottom-up search algorithm follows the same procedure used to find an inherited CPT when a CPT is created. The details of how a PCP is derived from a CPT are described further below. A second difference between a CPT and a PCP is that there can be no optional attributes in a PCP. In the governing CPT, attribute fields may be specified as either required or optional fields. When an attribute is optional, derivative CPTs can determine if the attribute should be included in the product's certificates. Since the PCP is the last template prior to certificate generation, these decisions must be made at this time.

As previously discussed with respect to Table 1, the third column specifies whether the CPT attributes are optional or mandatory in the PCP. An entry of "false" means that the attribute is required; whereas an entry of "true" means that the attribute is optional.

Table 4 shows how the user may create a PCP from the CPT data shown in Table 1. The first three columns of Table 4 are identical to those in Table 1. The fourth column shows the attributes selected by the user which are to be included in PCP. In this case, an entry of "true" in the fourth column means the attribute is to be included in the PCP. An entry of "false" means that the attribute is excluded the PCP. The first three attributes in Table 4 are included in the PCP by default because they are required by the source CPT. The remaining three attributes are optional (i.e., not mandatory by the CPTs). In this example the user has selected two of the three optional attributes, the second OrgUnit and the Country attributes.

TABLE 4

Optional Attribute Configuration When Creating PCP from CPT

CPT used for PCP creation

| Attribute Name | Value | Is Optional in PCP | User inputs Include in PCP |
|---|---|---|---|
| Common Name | $(MAC) | False | True (Mandatory) |
|  | $(MODEL_NAME) |  |  |
| Org | $(ORG) | False | True (Mandatory) |
| OrgUnit | ABC Consortium Devices | False | True (Mandatory) |
| OrgUnit | chipsetID:$(CHIPSET_ID) | True | True |
| OrgUnit | revision:$(REVISION) | True | False |
| Country | $(COUNTRY) | True | True |

At this stage in the PCP generation process, there are no more optional attributes: an optional attribute is included or excluded. The user creating the PCP may choose to replace any of the unassigned variables with their final values. The first column of Table 5 shows four of the variables from Table 4, specifically: MODEL_NAME, ORG, CHIPSET_ID and COUNTRY. The second column of Table 5 shows the final values that are assigned to these variables by the user who creates the PCP. The values that are chosen may need to conform to the respective variables' rules. For example, the value assigned to COUNTRY, "US", may need to be in the ISO3166-1-alpha-2 country code specification.

TABLE 5

Variable Input for Creating PCP

| Variable | Value (User inputs) |
| --- | --- |
| MODEL_NAME | Alpha 2300 |
| ORG | PKI Inc. |
| CHIPSET_ID | 12345 |
| COUNTRY | US |

In Table 5, some of the variables defined in Table 4 have been assigned with their final values for the generation process. However, variables do not need to be assigned final values to create the PCP. For example, the MAC variable is not assigned with a final value until the product/device certificate generation time. The PCP still contains the MAC variable as shown in the Common Name attribute in Table 6.

TABLE 6

PCP Created from Table 3 and 4

| Name (PCP) | Value (PCP) |
| --- | --- |
| Common Name | $(MAC) Alpha 2300 |
| Org | PKI Inc. |
| OrgUnit | ABC Consortium Devices |
| OrgUnit | chipsetID: 12345 |
| Country | US |

Figure 5:
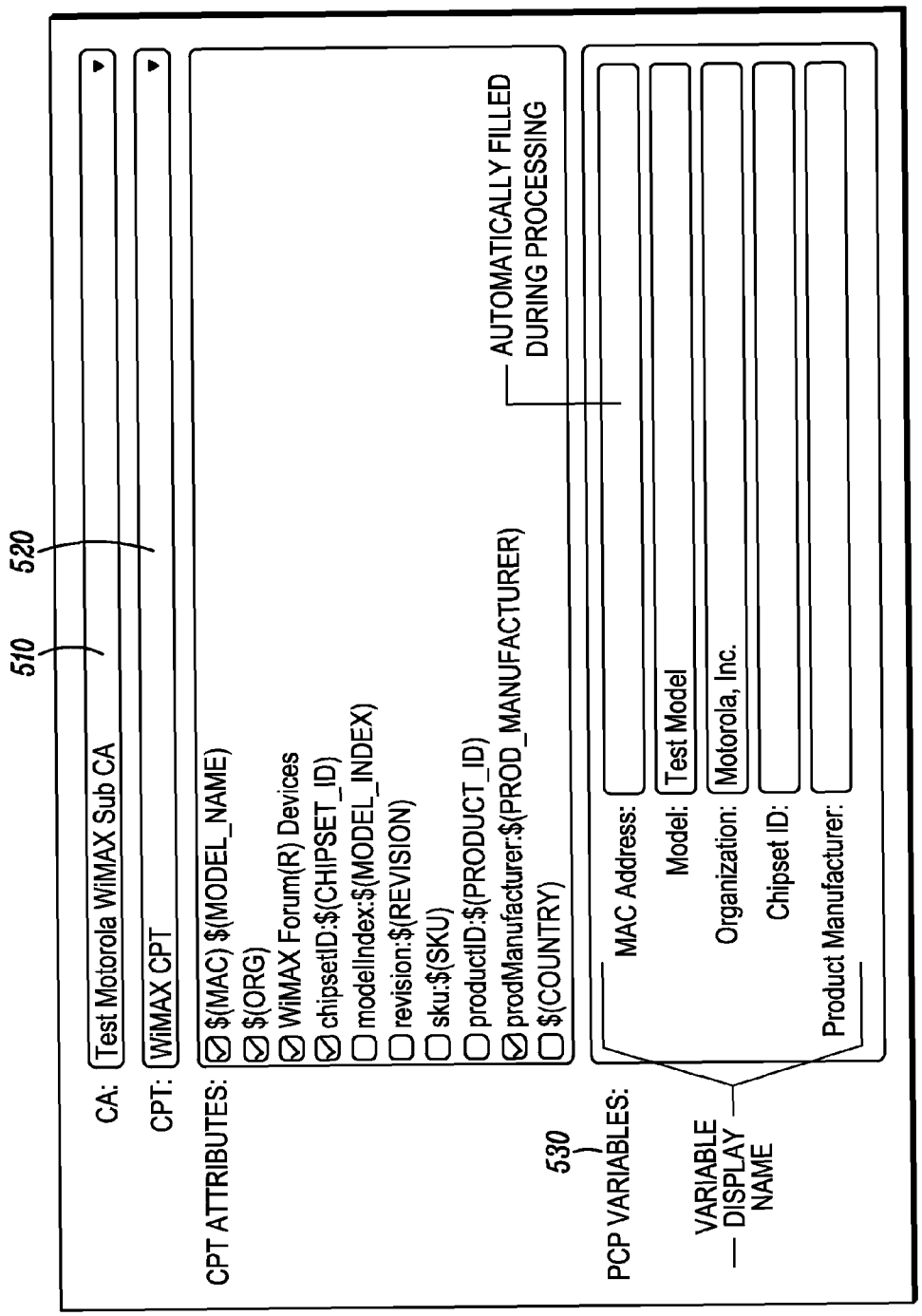
FIG. 5 shows an example of a graphical user interface (GUI) that may be employed by a user in order to create a Product Certificate Profile (PCP) based on CPT.

FIG. 5 shows an example of a graphical user interface (GUI) that may be employed by a user in order to create a PCP based on CPT. As shown, the user first selects the appropriate signing CA (510) and the corresponding CPT (520). Next, the PCP GUI shows a list of the attributes specified in the CPT. In this example all the attributes may contain one or more variables except for the third attribute, "WiMAX Forum® Devices". The first three attributes, which are grayed out, are the mandatory attributes defined in the CPT and thus are automatically selected. The following attributes are optional. The user may choose to include a selection of these optional attributes in the PCP. In this example, the user has selected the chipset ID attribute and the product manufacturer attribute.

The five attributes selected in FIG. 5 are now mandatory fields in the PCP and will appear in the product's certificates. Each of the variables contained in selected attributes is listed in field (530) so that the user may enter the appropriate values. In this example, the user specifies values for the model variable and the organization variable. Any certificates generated using this PCP contains those fixed values for the respective attributes. However, the MAC address, found in the common name attribute, is a unique variable (defined in Table 3) that has to be automatically filled during the generation of each certificate. The MAC address variable is assigned a unique value that cannot be duplicated, at the product certificate's generation time. In FIG. 5, values for the two other required attributes, the chipset ID and the product manufacturer, have not been provided by the user. Rather, these values are provided when a batch of one or more certificates is generated. This provides the user with additional flexibility; for instance, the particular chipset that is used may vary from batch to batch within the same product line. However, unlike the MAC address, which must be unique for each certificate, the Chipset ID and the Product Manufacturer must be the same for each certificate generated within the batch.

As the example of FIG. 5 illustrates, a PCP is created from a selected CPT with a set of product specific values provided by the user. After a PCP is created, users can assign values to the remaining unfilled variables and transform it to the final certificate profile for certificate generation. The PCPs may be used for generating digital certificates as described further below. FIG. 6 shows a preview of the subject attribute from the digital certificate to be generated from the PCP defined in FIG. 5.

Figure 7:
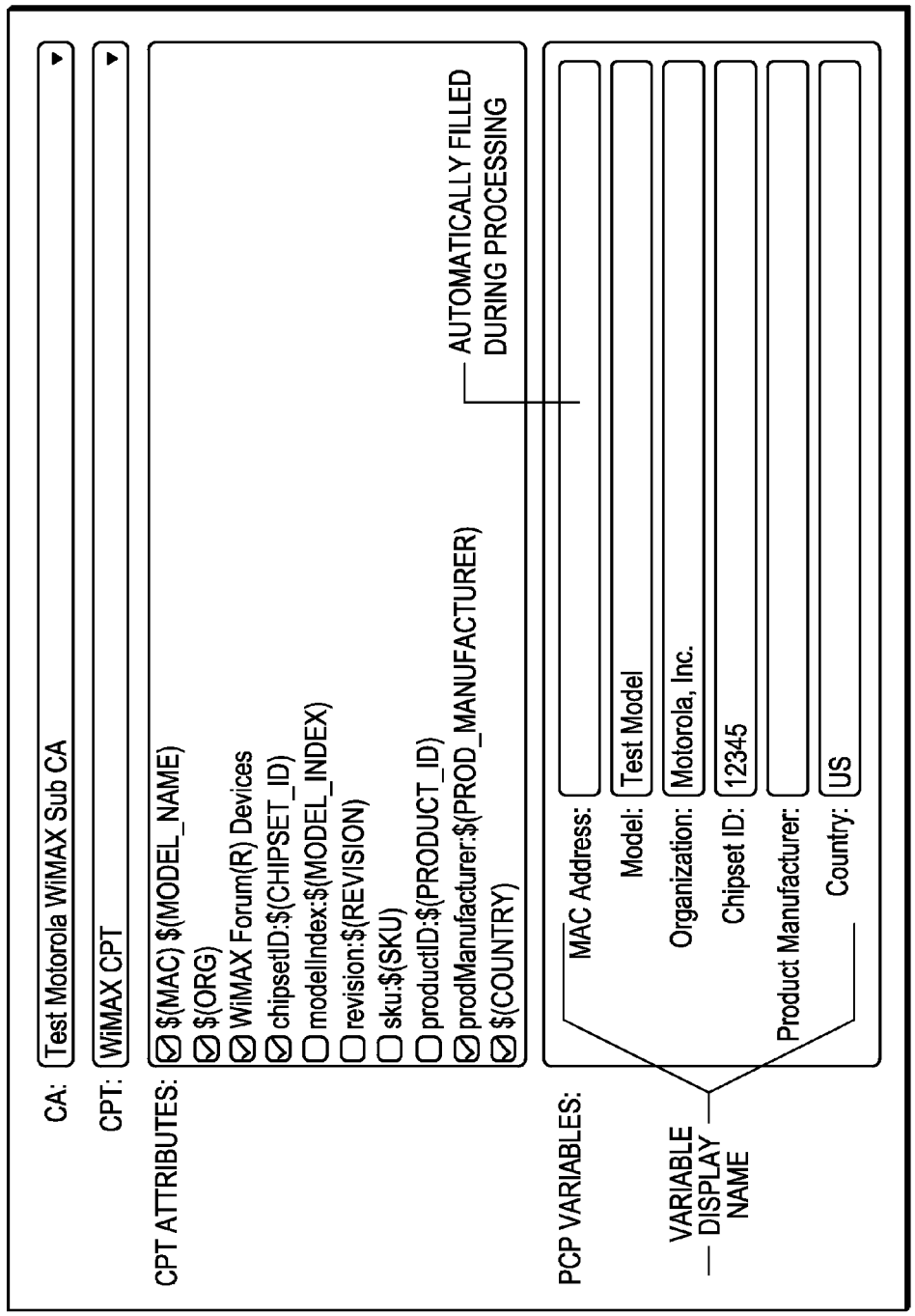
FIG. 7 shows another example of the previously described GUI shown in FIG. 5.

FIG. 7 shows another example of the previously described GUI shown in FIG. 5. In this case an additional optional attribute, the Country attribute, has been selected by the user. Additionally, the Chipset ID and Country variables have been specified with fixed values. FIG. 8 shows a preview of the subject attribute from the digital certificate to be generated from the PCP defined in FIG. 7.

FIG. 9 is an example GUI for generating a batch of digital certificates. In this example, Model Name and Manufacturer are unassigned variables in the selected PCP (Motorola China WiMAX Product MAC+1) which are now assigned with values "MD1000" and "Motorola, Inc.", respectively. The user generating the batch also needs to enter the ID range, which in this case is the MAC address range for this particular batch. A starting MAC address and the quantity of certificates to be generated are entered, and the ending MAC address is automatically calculated in this GUI of this example.

The generation of the batch may only continue if all unassigned variables in the PCP (except for the unique variables which are not shown in the GUI through which the order is placed) are filled with final values. The PKI data generation component is now able to retrieve all the finalized attributes from this final PCP as a parameter input necessary for the digital certificate generation. The unique variables, on the other hand, are specified during certificate generation with unique values for each certificate. For example, the MAC address is a unique attribute in the illustrative PCP shown in FIG. 5.

In addition to the CPT and the PCP, another configuration mechanism that may be defined in the PKI system is the Certificate Management Configuration (CMC). The CMC specifies how the PKI data generated is to be managed during their lifecycle. For example, the CMC may address issues such as how long PKI data should be archived before deletion, the certificate renewal period, the number of reminders to be sent to the responsible party before certificate expiration, the number of times a certificate can be renewed, and so on.

Each organization participating in a PKI system may have its own PKI data management policies. Accordingly, CMCs may be arranged in a hierarchical structure similar to the structure used for the CPTs (as shown in FIG. 4). However, CMCs are not tied to the CA hierarchy but rather their own hierarchy corresponding to the organizations and products in the PKI system. An example of such a hierarchy is shown in FIG. 10.

Figure 10:
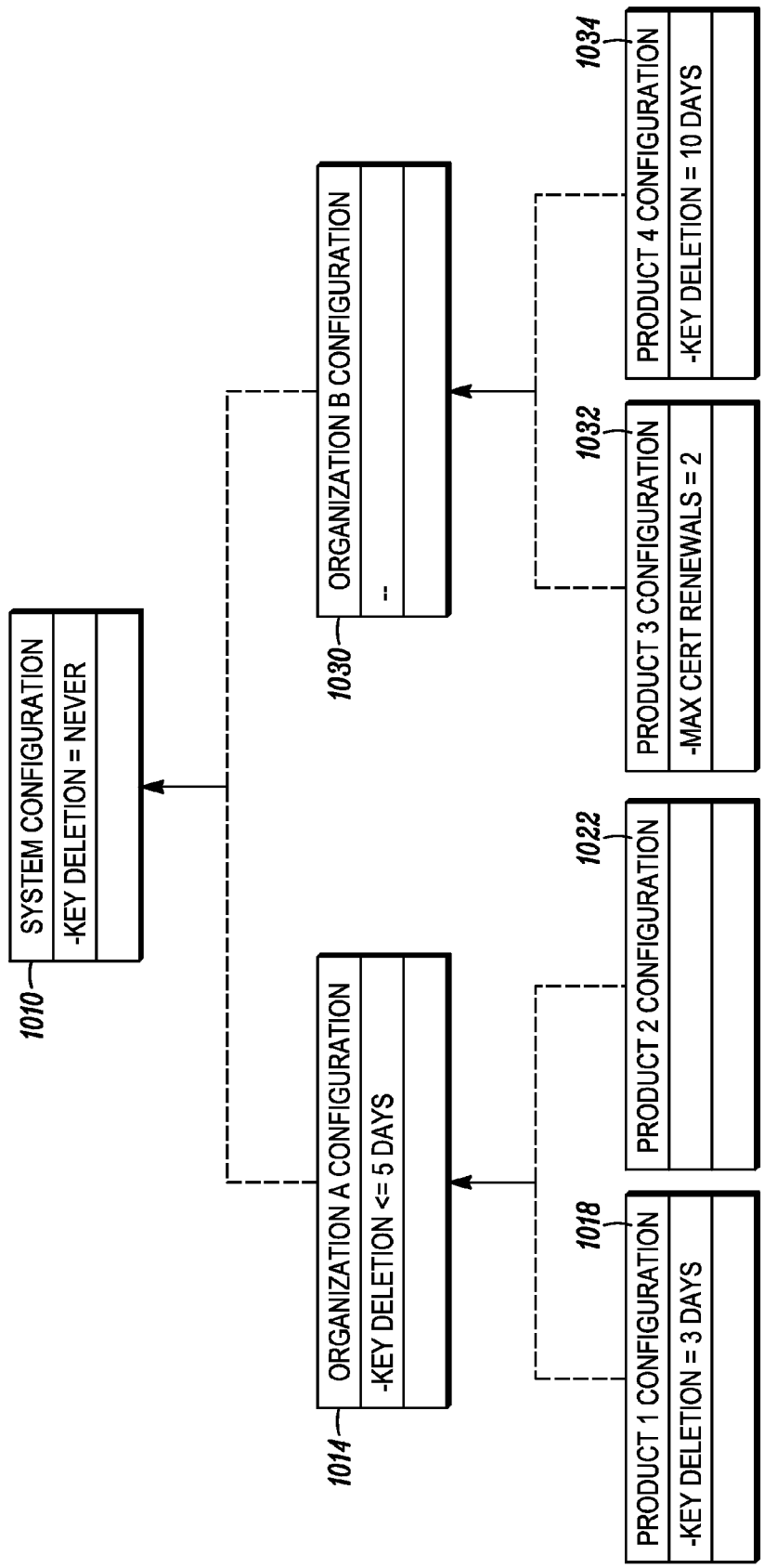
FIG. 10 shows an example of a Configuration Management Configuration (CMC) hierarchy.

The hierarchy in FIG. 10 shows an example of an element that may be included in the CMC files, which is the parameter specifying how long private keys should be archived before deletion from the PKI system. In this example the CMC hierarchy begins with a CMC at the system configuration level (1010), which specifies a system-wide key deletion policy. At this level the CMC is the most generic in the hierarchy and places a minimum number of restrictions on the data management required by the consortium. In this example, the keys are not ever required to be deleted at the system level. On the other hand, the CMC defined by organization A (1014) requires the keys to be deleted within five days. This is a more narrow restriction than is imposed by the CMC at the system level, and is also considered more secure. As further shown, at the product 1 configuration level (1018), the CMC key deletion policy is even more restrictive, requiring keys to be deleted in three days. Thus, as one moves down the CMC hierarchy as shown in FIG. 10, the key deletion policy for this particular project goes from less secure to more secure. This illustrates that all CMC values shall not be less restrictive than the values in its parent's CMC.

Lower level CMCs can also be made more restrictive by adding new parameters not previously included in the higher level CMCs. The hierarchy in FIG. 10 also shows an example of this method of restriction. In this example the CMC hierarchy begins with a CMC at the system configuration level (1010), which specifies a system-wide key deletion policy. Proceeding down the chain to the organization level, Organization B (1030) does not specify a CMC and therefore uses all the configurations made at the system level (e.g. the key deletion policy). Finally, reaching the product configuration level, Product 3 (1032) has a CMC which does not redefine the system-wide key deletion policy specified at the system configuration level 1010. However, product 3's CMC does add a new policy regarding the maximum number of times a certificate for that product may be renewed (in this example, two times). By adding a new policy, the configuration has been made stricter than the CMC defined at 1010 without changing any of the values previously defined in the system configuration level's CMC.

When the PKI system manages PKI data it uses a bottom-up approach through the hierarchy to find the appropriate data management policies. This is illustrated in FIG. 10, which shows the CMC searching a path for the key deletion policy for products depicted in 1018, 1022, 1032 and 1034. With respect to Product 1 and Product 4, the CMCs are defined at the product level so that the PKI management system does not need to do further searching. With respect to Product 2, the CMC for the key deletion policy is not defined at the product level. In this case the PKI system begins by searching the policy specified by the CMC at the product level, all the way upward until a specific policy definition, the key deletion policy in this case, is found. In this example, the PKI system uses the key deletion policy in 1014 since it is the first CMC found in the path of Product 2. Similarly for Product 3 the system level CMC (1010) is used since no CMC is defined by either Product 3 or its organization. Thus, as this example illustrates, CMCs allow flexible configuration of various management policies throughout the PKI System.

Figure 11:
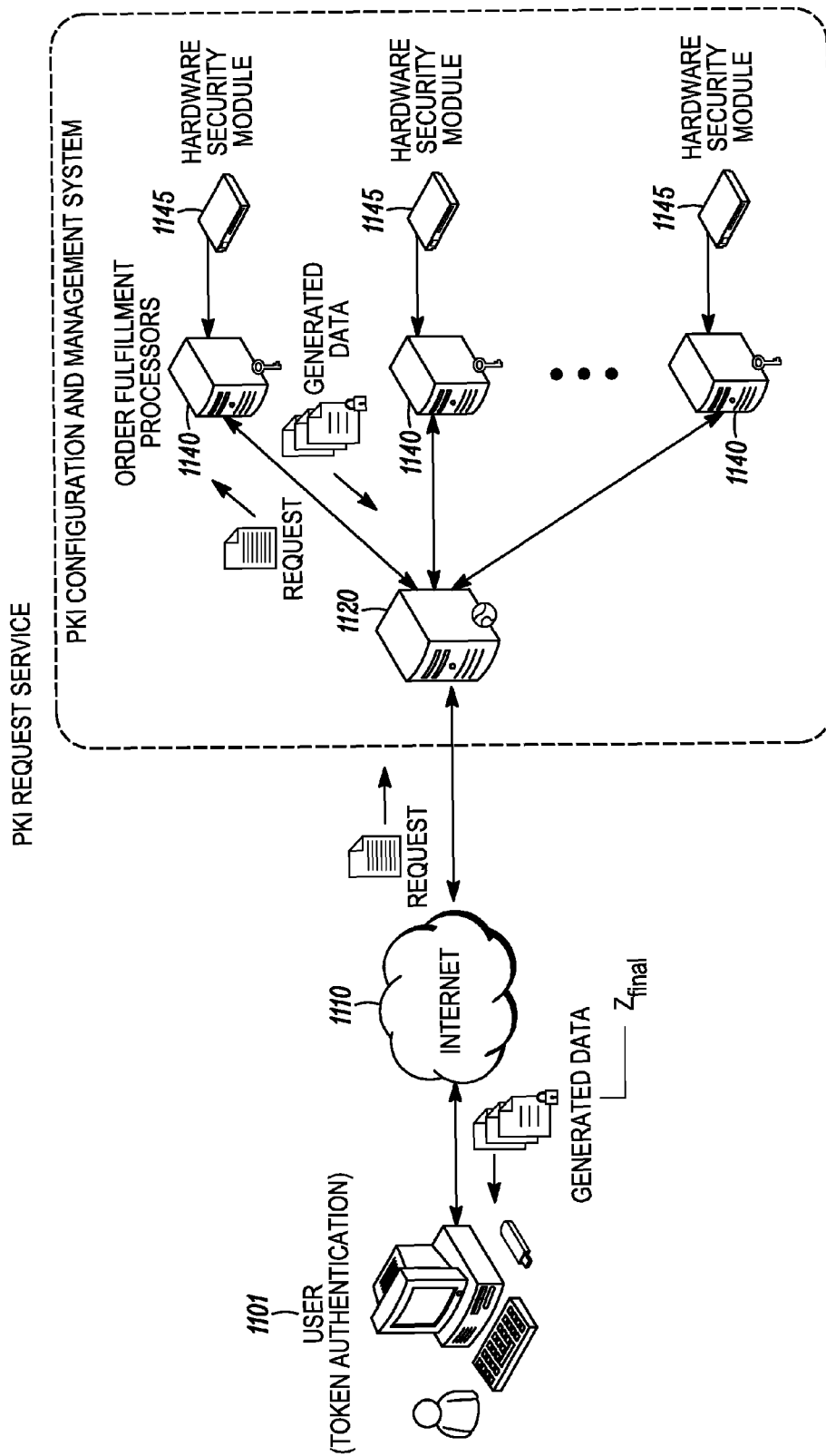
FIG. 11 shows a simplified schematic diagram of an illustrative PKI management system from which users may obtain identity data to be provisioned in product devices.

FIG. 11 shows a simplified schematic diagram of an illustrative PKI management system from which users may obtain identity data to be provisioned in product devices. The PKI management system may incorporate the methods and techniques described above. The system includes a user 1101 who communicates with the system over the Internet 1110 or any other packet-based wide area network. In this example the customers access and interact with the system through one or more web portal servers 1120, which provides a single front-end interface that is accessed by a client-based application such as a conventional web browser.

The PKI management system typically includes one or more physical server computers with one or more physical storage devices and databases as well as various processing engines. In particular, in the example shown in FIG. 11, the system includes order fulfillment processors 1140 which generate digital certificates or other identity data requested for products. The order fulfillment processors may include, or have access to, hardware security modules (HSMs) 1145 in which the CA's certificate signing private keys and secure data may be stored for use by the system. Of course, the PKI management system may include a number of other devices and databases not shown in FIG. 11. For instance, the PKI management system may contain a database of records. These records may pertain to issued digital certificates, original requests for new digital certificates or secure data, audit data, organization information, product configurations, user information, and other record types as necessary. The PKI service provider is the organization or company that implements and the Public Key Infrastructure and delivers PKI services to other entities such as organizations and companies.

The user 1101 uses a desktop client application to perform extraction and verification upon receiving requested results from the PKI Service Provider. This application, referring to herein as a package verification client, contains the PKI service provider's root signing key certificate. Before a customer initiates a PKI data request, the user is first authenticated to ensure his or her identity. Next, the user submits a request over the Internet 1110 to the web portal server 1120, which in turn forwards it on to the order fulfillment processors 1140. The order fulfillment processors generate the requested data (denoted by $Z_{final}$) which can be subsequently downloaded by the customer 1101 via the web portal server 1120 and the Internet 1110.

One particular implementation of a PKI system of the type described above is shown in U.S. Appl. Ser. No. 12/854,920, which is hereby incorporated by reference in its entirety.

As used in this application, the terms "component," "module," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

The invention claimed is:

1. A method performed by public key infrastructure (PKI) management system for generating identity data to be provisioned in product devices that are a part of a project, comprising:

establishing at a network interface computer a template associated with each certificate authority (CA) in a hierarchical chain of CAs having a root CA at a highest level in the chain and a signing CA at a lowest level in the chain, wherein the template associated with the signing CA inherits mandatory attribute fields specified in the root CA and any intermediate CA in the hierarchical chain, said mandatory attribute fields being user-specifiable fields to be populated with public key infrastructure (PKI) data;

generating at the network interface computer a configuration file upon receipt at the network interface computer of an order for digital certificates using PKI data provided by a user computer to populate the mandatory attribute fields of the template associated with the signing CA; and generating the digital certificates requested in the order with order fulfillment processors communicating with the network user interface using the PKI data in the configuration file.

2. The method of claim 1 wherein the template associated with the signing CA has a more restrictive format than a template associated with at least one CA located at a higher level in the hierarchical chain.

3. The method of claim 2 wherein the template associated with the signing CA is made more restrictive by requiring at least one optional attribute field specified in a template associated with CAs at a higher level in the chain.

4. The method of claim 2 wherein at least one of the mandatory fields or the optional attribute field that is now required is populated with a user-specifiable variable and further comprising receiving from the user a final, fixed value for the user-specifiable variable.

5. The method of claim 4 further comprising validating the final, fixed value to ensure it conforms to one or more pre-established rules defining the user-specifiable variable.

6. The method of claim 1 wherein establishing the template associated with each CA includes sequentially searching each higher level in the hierarchical chain to extract mandatory attribute fields and optional attribute fields from each available template associated with CAs at the higher levels and including the extracted mandatory and optional attribute fields in the template associated with the signing CA.

7. The method of claim 1 wherein at least one of the mandatory fields or the optional attribute field that is now required is populated with a user-specifiable variable and further comprising selecting a fixed, final value for the user-specifiable variable value when an order for the identity data is fulfilled.

8. The method of claim 7 wherein each of the fixed, final values is unique at least among all other fixed, final values generated for all orders associated with the project.

9. The method of claim 7 further comprising receiving from the user a range of values within which the fixed, final values are to be generated and further comprising selecting the fixed, final values so that they are within the received range of values.

10. The method of claim 1 wherein the project is logically divided into a plurality of hierarchical levels each of which is associated with at least one participating organization and/or a product that is part of the project and further comprising establishing a PKI data management policy for each hierarchical level such that the PKI data management policy at an uppermost of the levels is least restrictive and the PKI data management policy at a lowermost of the levels is most restrictive.

11. The method of claim 10 wherein at least one of the PKI data management policies established at a lower level in the hierarchy of levels includes at least one additional policy requirement not present in one of the PKI data management polices established at a higher level in the hierarchy of levels.

12. The method of claim 10 wherein the PKI data management policy includes a lifecycle policy relating to retention, renewal and revocation of the generated identity data.

13. The method of claim 3 wherein at least one of the mandatory fields or the required optional attribute field is required to be populated with a value that is unique for all orders associated with the project.

14. The method of claim 3 wherein the mandatory attribute fields and the required optional attribute field all relate to attributes to be included in the digital certificates.

15. A method for managing public key infrastructure (PKI) data used in a PKI project that is logically divided into a plurality of hierarchical levels each of which is associated with at least one participating organization and/or a product that is part of the project, comprising:

establishing a PKI data management policy for each hierarchical level using a PKI management processor interfacing with user network computers such that the PKI data management policy at an uppermost of the levels is least restrictive and the PKI data management policy at a lowermost of the levels is most restrictive; and implementing the PKI data management policies using the PKI management processor so that PKI data associated with each hierarchical level conforms to the PKI data management policy established for that level, wherein the PKI data management policy utilizes a template associated with each certificate authority (CA) having at least one attribute field in a higher one of the hierarchy of levels not present in one of the PKI data management policies established at a lower level in the hierarchy of levels.

16. The method of claim 15 wherein the at least one attribute field is populated with a user-specifiable variable.

17. The method of claim 15 wherein the at least one attribute field includes a mandatory attribute field and an optional attribute fields associated with a signing CA, wherein the mandatory attribute field can be inherited.

18. A public key infrastructure (PKI) management system comprising:

a front-end interface that is accessible to users over a communications network;

at least one order fulfillment processor configured to generate identity data to be provisioned in product devices in accordance with customer requests associated with a project and received by the front-end interface; and wherein the front-end interface is configured to:

(i) establish a template associated with each certificate authority (CA) in a hierarchical chain of CAs associated with the project, said hierarchical chain of CAs having a root CA at a highest level in the chain and a signing CA at a lowest level in the chain, wherein the template associated with the signing CA inherits mandatory attribute fields specified in the root CA and any intermediate CA in the hierarchical chain, said mandatory attribute fields being user-specifiable fields to be populated with PKI data;

(ii) generate a configuration file upon receipt of an order from a user for digital certificates using PKI data provided by the user to populate the mandatory attribute fields of the template associated with the signing CA; and (ii) generate the digital certificates requested in the order using the PKI data in the configuration file.

19. The system of claim 18 wherein the template associated with the signing CA has a more restrictive format than a template associated with at least one CA located at a higher level in the hierarchical chain.

20. The system of claim 18 wherein the project is logically divided into a plurality of hierarchical levels each of which is associated with at least one participating organization and/or a product that is part of the project and wherein the front-end interface is further configured to establish a PKI data management policy for each hierarchical level such that the PKI data management policy at an uppermost of the levels is least restrictive and the PKI data management policy at a lowermost of the levels is most restrictive.

* * * * *